United States Patent [19]

Gruber et al.

[11] 4,058,701
[45] Nov. 15, 1977

[54] GLOW ELEMENT ARRANGEMENT FOR ELECTRIC CIGARETTE LIGHTERS

[75] Inventors: Carl F. Gruber, Frankfurt am Main-Griesheim; Georg Seibel, Dreieichenhain, both of Germany

[73] Assignee: Schoeller & Co. Elektrotechnische Fabrik GmbH & Co., Frankfurt, Germany

[21] Appl. No.: 753,011

[22] Filed: Dec. 21, 1976

Related U.S. Application Data

[63] Continuation-in-part of Ser. No. 575,079, May 6, 1975, abandoned.

[30] Foreign Application Priority Data

May 14, 1974 Germany .............................. 2423431

[51] Int. Cl.² ............................................. F23Q 7/22
[52] U.S. Cl. .................................... 219/270; 219/264; 219/541; 219/553; 338/22 SD; 338/330; 361/264
[58] Field of Search ............... 219/260, 262, 263, 264, 219/265, 266, 267, 270, 463, 468, 538, 530, 541, 547, 552, 553; 338/21, 22 R, 22 SD, 52, 223, 330; 361/264, 266; 317/98

[56] References Cited

U.S. PATENT DOCUMENTS

| 1,663,675 | 3/1928 | Ayotti ........................ 219/270 X |
| 1,946,434 | 2/1934 | Bach ............................. 219/270 |
| 2,253,376 | 8/1941 | Johnson ......................... 338/21 |
| 2,975,262 | 3/1961 | Schick .......................... 219/270 |
| 3,375,774 | 4/1968 | Fujimura et al. ........... 338/22 R X |
| 3,467,812 | 9/1969 | Terrell ......................... 219/264 |
| 3,560,705 | 2/1971 | Mendenhall ................... 219/265 |
| 3,793,604 | 2/1974 | Duggan et al. .............. 338/22 R |
| 3,829,739 | 8/1974 | Anderson et al. ........... 361/264 |
| 3,876,861 | 4/1975 | Wightman et al. .......... 219/530 X |
| 3,885,129 | 5/1975 | Fabricius ...................... 219/553 |

FOREIGN PATENT DOCUMENTS 1,023,500  3/1966  United Kingdom ............ 338/225 D

*Primary Examiner*—Volodymyr Y. Mayewsky
*Attorney, Agent, or Firm*—Toren, McGeady and Stanger

[57] ABSTRACT

A glow element arrangement for electric cigarette lighters includes a disk-shaped semiconductor element of predetermined geometric configuration. The element has electrically conductive contacting surfaces for the supply of electrical current. Various arrangements are disclosed for protecting the semiconductor element, for supplying current to the contacting surfaces and for preventing stress from being applied to the semiconductor element.

11 Claims, 31 Drawing Figures

GLOW ELEMENT ARRANGEMENT FOR ELECTRIC CIGARETTE LIGHTERS

CROSS-REFERENCE TO RELATED APPLICATION

This is a continuation-in-part of U.S. application Ser. No. 575,079, filed May 6, 1975 now abandoned.

BACKGROUND OF THE INVENTION

The present invention relates to glow elements for a vehicle cigar or cigarette lighters and, more particularly, to a glow element employing a semiconductor material.

In a vehicle cigar or cigarette lighter, glow elements are used which are supplied with current from the vehicle battery. Such elements consist of a metal pan in which a spirally wound heating conductor band is arranged. One extreme end of the heating conductor is welded, clamped or riveted on the pan. In the center of the pan, the other end is electrically connected to a pin or threaded bolt. This pin or threaded bolt is secured in the center of the pan.

The glow element are preferably made of a material with a rectangular cross section and are wound as a spiral. There are also arrangements where a coil of round heating conductor material is arranged spirally in the pan. These glow elements have the inherent deficiency that individual turns of the spiral can spring forward from the winding plane by jarring blows to the heating conductor when the cigarette lighter is disconnected. This can cause short circuits which, in turn, can destroy the heating conductor winding.

This deficiency must be eliminated by various measures, such as by profiling the heating conductor for mechanical hooking of the turns, or by providing a damping disk on the plug of the lighter in order to make the jarring blow harmless. The same function can be served by having heat resistant glazes or ceramic pastes which are embedded in the heating conductors.

In order to prevent interturn short circuits of the individual turns of the spiral, mica insulators were used in the past. At present, an electrically insulating oxide film is applied by special oxidation methods to the surface of the heating conductors. Such glow elements have the further disadvantage, however, that an inwardly bent deformed bimetal spring of the plugbox can be hooked with the top end between the heating conductor windings or between the heating conductor winding and the edge of the can, thus causing overheating of the lighter. Also, when wound heating conductors are used, a disadvantage is the unequal temperature distribution, with particularly low temperatures in the center of the glow spiral.

SUMMARY OF THE INVENTION

It is an object of the present invention therefore to provide a glow element for an electric lighter which is insensitive to jarring blows and which is reliable in operation.

It is a further object of the present invention to provide a glow element for an electric lighter which completely eliminates the need for winding of resistance wire for the element.

It is another object of the present invention to provide a glow element for an electric lighter which cannot be destroyed by interturn winding shorts.

It is still another object of the present invention to provide a glow element for an electric lighter which is insensitive to tobacco particles or tobacco ashes and consequently has an extended service life.

It is a still further object of the present invention to provide a glow element for an electric lighter which is economical to manufacture and assemble so that it may be easily mass-produced.

In accordance with the present invention, a glow element for electric cigarette lighters comprises a disk-shaped semiconductor element of predetermined geometric configuration having conductive contacting surfaces for the supply of electrical current. The semiconductor element may be a pressed or sintered semiconductor consisting essentially of silicon carbide. The contacting surfaces may be a non-scaling metallic material and applied to the disk by flame spraying.

One of the contacting surfaces is, in one embodiment, applied to an outer portion or edge of the semiconductor disk and a current-carrying lug affixed thereto. The semiconductor element may include a central recess with the second contacting surface being disposed on the semiconductor in the recess. A threaded bolt, in one form of the invention, is fastened to and in electrical contact with the second contacting surface for supplying current to the semiconductor disk.

In another arrangement, the semiconductor disk includes supporting portions which are diametrically arranged. The electrical contacts are applied to these portions so that current will flow across the element rather than radially.

The invention also encompasses various embodiments for protecting the semiconductor and preventing stress to the semiconductor, including the use of a protective pan.

For a better understanding of the present invention, together with other and further objects thereof, reference is made to the following description and accompanying drawings, while the scope of the invention is pointed out in the appended claims.

DESCRIPTION OF THE INVENTION

Figure 1:
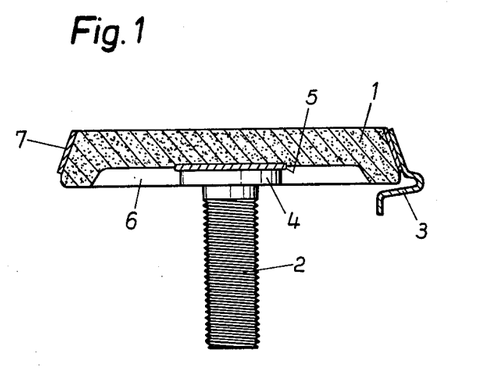
FIG. 1 illustrates a side sectional view of a glow element.

Referring initially to FIG. 1, the glow element consists of the semiconductor disk 1, the threaded bolt 2, and the current carrying lug 3. The threaded bolt 2 has a flange 4. The flange of the threaded bolt 2 is preferably welded on a contacting surface 5 which consists, for example, of a nickel steel coat applied by flame spraying to the semiconductor disk 1. The contacting surface 5 is arranged in a recess 6 in the center of the semiconductor disk 1. The conically tapered edge of the semiconductor disk 1 is provided with a ring-shaped contacting layer 7, which is similarly applied by flame spraying to the semiconductor disk and welded on the current carrying lug 3.

The semiconductor element is typically a pressed or sintered semiconductor which may be composed of silicon carbide, for example. The contacting surfaces may be made of any suitable non-scaling material which is substantially unaffected by temperature change, such as the nickel steel referred to above.

Figure 2:
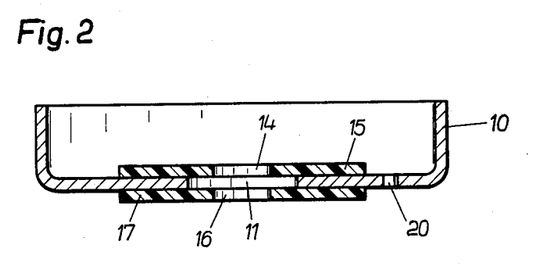
FIG. 2 illustrates a side sectional view of a protection pan for a glow element.
Figure 3:
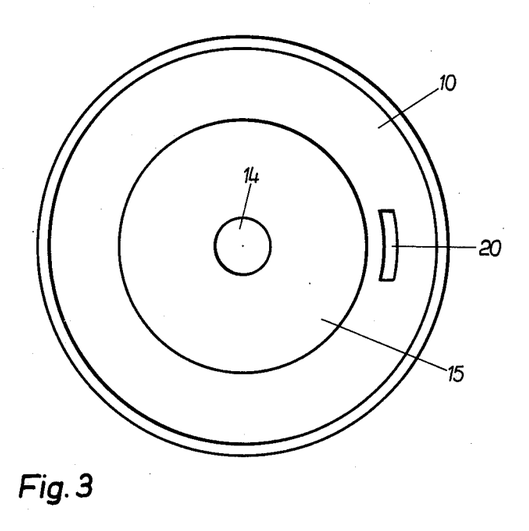
FIG. 3 shows a plan view of the protective pan according to FIG. 2.
Figure 4:
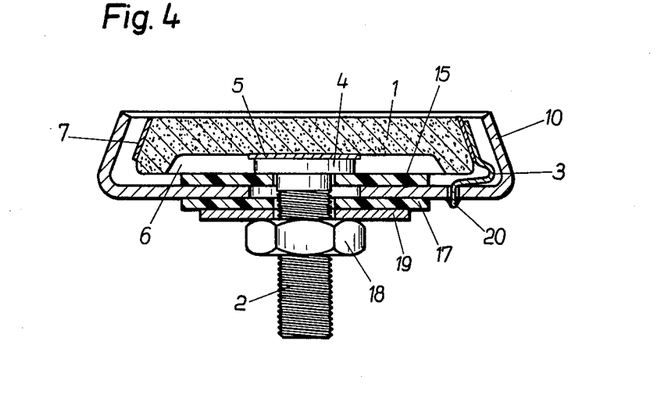
FIG. 4 shows a side sectional view of the glow element inserted in the protective pan.
Figure 5:
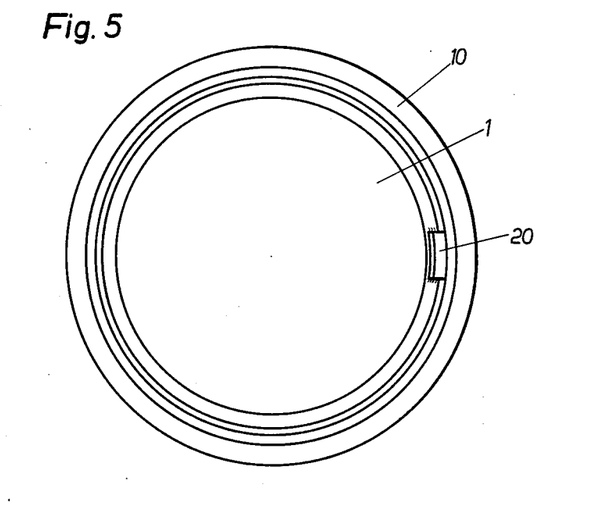
FIG. 5 shows a top view of the arrangement according to FIG. 4.
Figure 6:
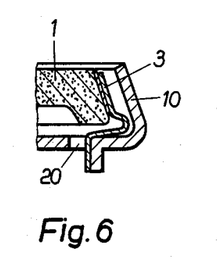
FIGS. 6–8 show different types of means for fastening the current carrying lug on the protective pan.
Figure 7:
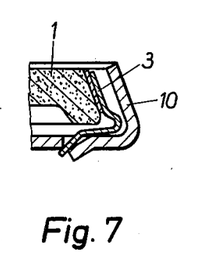
Figure 8:
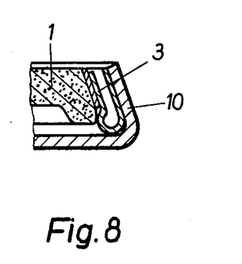

In order to protect the semiconductor disk 1 against damage, a protective pan 10 is provided (FIG. 2) and is attached to a threaded bolt 2. The threaded bolt 2 extends through a bore 11 in the pan, a corresponding bore 14 provided in insulating disk 15 and another corresponding bore 16 provided in insulating disk 17. In assembly, insulating disk 15 bears on the flange 4 of the threaded bolt 2, as can be seen from FIG. 4. A nut 18 screwed on the threaded bolt 2 holds the arrangement together. The edge of pan 10 is flanged and the current carrying lug 3 is welded or clamped to the pan 16, as shown in FIGS. 6 to 8. Pan 10 preferably includes a slot 20 in FIGS. 6 and 7 through which a portion of the lug 3 extends. In FIG. 8, the lug is U-shaped, one part of which is welded to the semiconductor body and the other part bearing against the flange.

Figure 9:
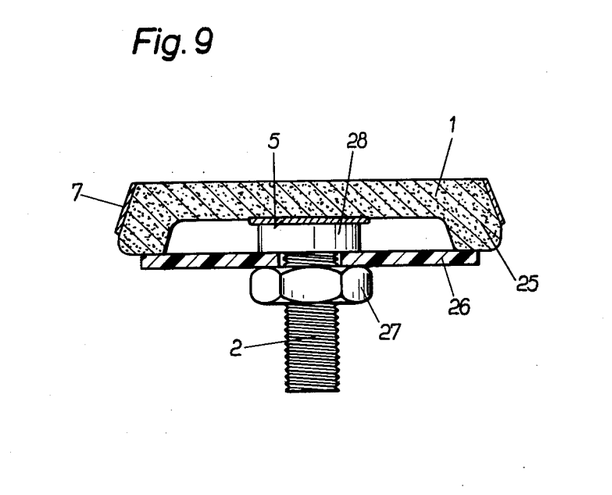
FIG. 9 shows a side sectional view of another embodiment of the glow element of the present invention.
Figure 10:
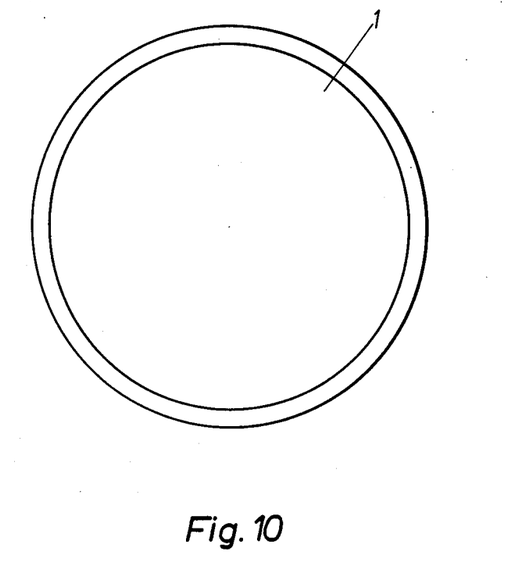
FIG. 10 shows a plan view of the element according to FIG. 9.

In the embodiment of FIGS. 9 and 10, the pan 10 is eliminated. Instead, the edge 25 of the semiconductor disk 1 is reinforced. The reinforced edge supports a disk 26 which is held on the flange 28 of the threaded bolt 2 by a nut 27. The width of flange 28 corresponds exactly to the depth of the recess 6 of the semiconductor disk 1, so that the disk 26 exerts no pressure on the semiconductor disk 1 when the nut 27 is tightened.

Figure 11:
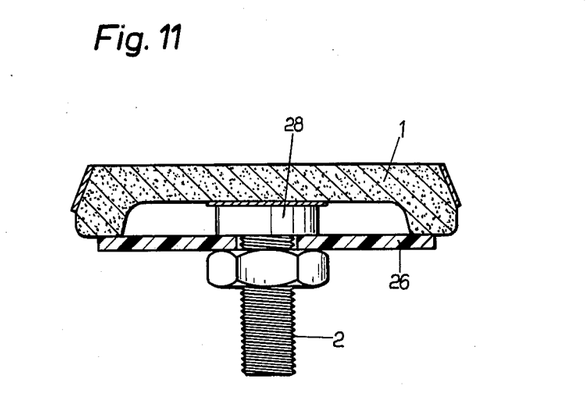
FIGS. 11 and 12 show a section and a top view of a square glow element.
Figure 12:
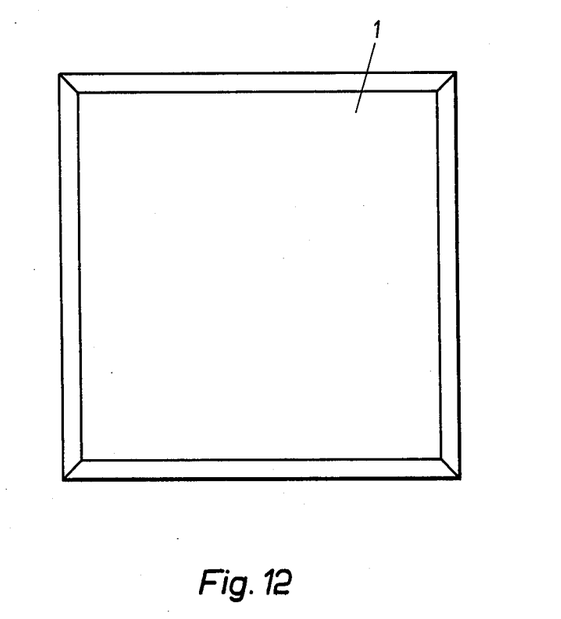

The semiconductor plates of the glow elements according to FIGS. 1 to 10 have a circular form. However, they can also have any other form, for example, a square form, as shown in FIGS. 11 and 12. An oval form is also possible.

In the embodiment according to FIGS. 1 to 8, and in the embodiment according to FIGS. 9 and 10 and FIGS. 11 and 12, respectively, the semiconductor disk 1 of the glow element is secured completely stress-free, and stresses which are caused by the flanging operation, by temperature changes and by use, cannot act on the sensitive disk because the mechanical stresses are absorbed by the flange of the threaded disk 2. Further, stress cannot be imparted to disk 1 by way of the lug 3 because of the resilient loop of the current carrying lug.

Figure 13:
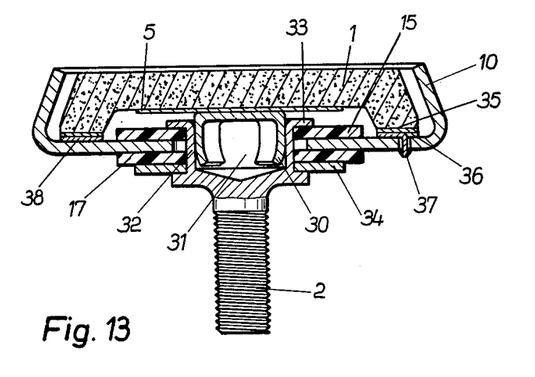
FIG. 13 shows a sectional glow element with clamp.

As shown in FIG. 13, the central contacting surface 5 of the semiconductor disk 1 may be provided with a clamp 30 serving as a contact, which can be soldered on or welded on. The clamp 30 engages a blind recess or hold 31 provided at the end of the bolt 2. The end of bolt 2 in this embodiment may be designed as a hollow rivet 32 having an upper end formed as a flange 33 when the two insulating disks 15 and 17 holding the protective pan 10 and the washer 34 are attached. End face 35 of the semiconductor disk 1 is provided with a ring-shaped contacting surface 36 on which a contact ring 38 connects with the pan 10 by way of lug 37 which is soldered or welded.

Figure 14:
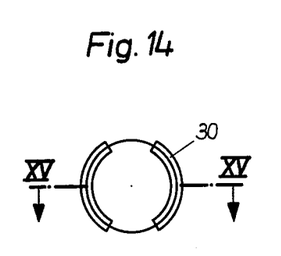
FIG. 14 shows a plan view of the clamp according to FIG. 13.
Figure 15:
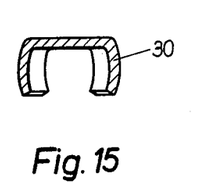
FIG. 15 shows a section through the claim according to FIG. 13 along the line XV—XV of FIG. 14.
Figure 16:
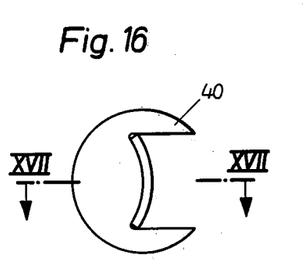
FIG. 16 shows another embodiment of the claim in a plan view.
Figure 17:
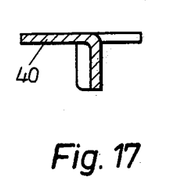
FIG. 17 shows a section through the clamp along the line XVII—XVII of FIG. 16.

FIGS. 14 and 15 show the clamp 30 of FIG. 13 in a top view and in section. The two-arm clamp 30 also be replaced by a one-arm clamp 40, as shown in FIGS. 16 and 17 in a top view and in section.

Figure 18:
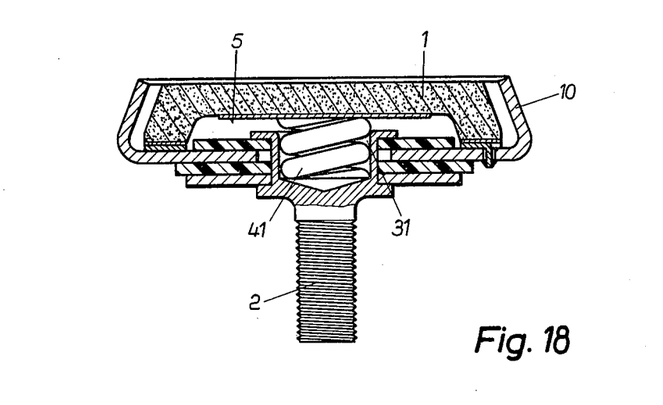
FIG. 18 shows a sectional view of a glow element with a helical compression spring.
Figure 19:
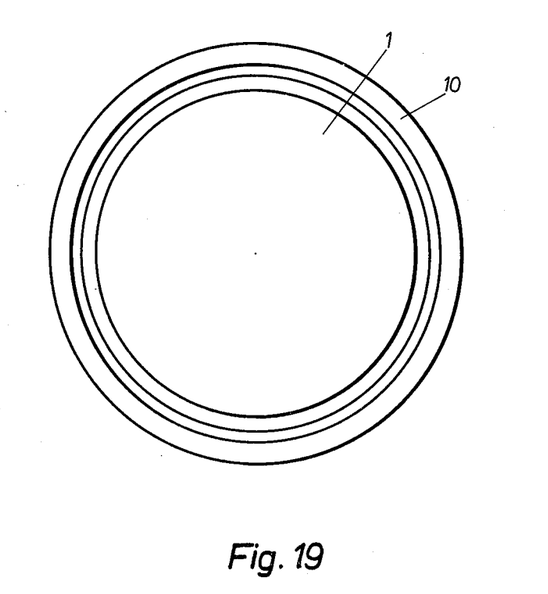
FIG. 19 shows a plan view of the glow element according to FIG. 18.

In the embodiment of FIGS. 18 and 19, a helical compression spring 41 is secured to the central contacting surface 5 and acts as a contact element. The spring protrudes into the blind hole of the threaded bolt 2. The compression spring 41 acts to absorb forces on the assembly to reduce stresses directed to the semiconductor element.

Figure 20:
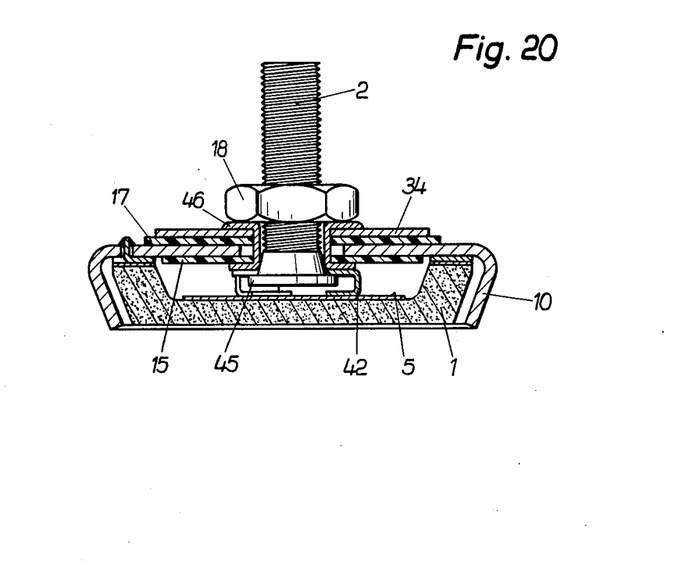
FIG. 20 shows a sectional view of a glow element with claw.
Figure 21:
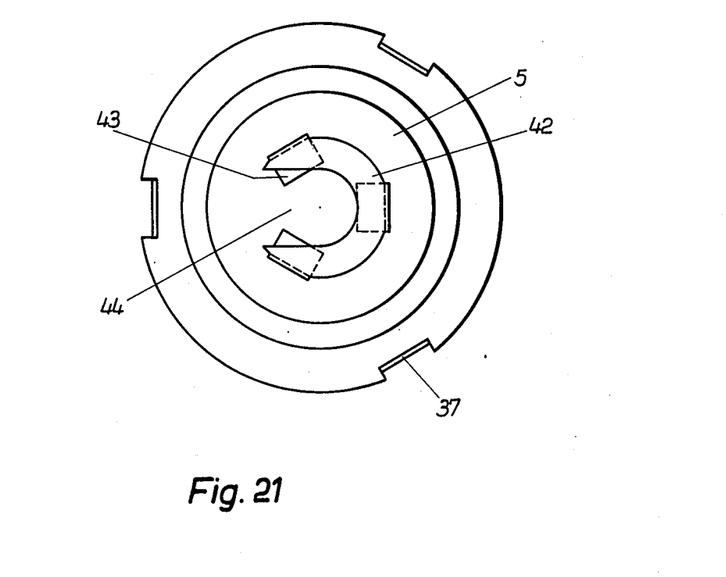
FIG. 21 shows a top view of the semiconductor disk with claw according to FIG. 20.

Another detachable connection between the semiconductor disk 1 and the threaded bolt 2 is shown in FIGS. 20 and 21. Here a claw element 42 is attached on the central contacting surface 5, which is soldered on or welded on by means of lug 33. Into the opening 44 of the claw element 44 is inserted a flange 45 arranged at the end of the threaded bolt 2 and then tightened by means of nut 18, the hollow rivet 46 holding the disks 15, 17 and 34 and the protective pan 10 serving as an abutment.

The basic arrangement of a semiconductor glow element having electrical contacting surfaces eliminates a variety of the deficiencies of the wire wound designs.

Furthermore, an advantageous development of the invention includes that one contacting surface surrounds the outer edge of the semiconductor disk in ring form and is provided with a welded elastic current-carrying lug. Another contacting surface can be arranged in a recess in the center of the semiconductor disk and can be used for welding on a threaded bolt for holding the disk, and for the current supply. The threaded bolt can have at its end, welded with the contacting surface of the semiconductor disk, a flange for the attachment of a protective pan surrounding the semiconductor disk. The protective pan can be clamped on the threaded bolt between two insulating disks, the flange, and a nut.

Due to this mounting, the disk-shaped glow element is secured completely stress-free. A harmful effect of the thermal stresses is, thus, effectively avoided. Stresses caused by the flanging process, temperature changes and by use, can have no effect on the sensitive disk, because the mechanical stresses are absorbed by the bearing edge of the central connecting screw and cannot act on the elastic loop of the current carrying lug. In the protective pan can be provided a slot for fastening the current carrying lug. The current flows from the central threaded bolt radially to the outer contact ring provided by flame spraying, so that a homogeneous temperature surface is obtained in the entire thin range of the disk-shaped glow element.

By a correspondingly reinforced edge zone or by a U-shaped cross section, the protective pan can be eliminated for making contact. Additional insulation between the disk and the ceramic glow element is not necessary in the represented embodiment, because direct contact-making by contact alone is not possible by the semiconductor disk.

The glow element cannot only be circular, it can also have other geometric forms, for example, rectangular or square.

Instead of a rigid connection between the threaded bolt and the semiconductor disk a detachable plug connection can also be provided. In such embodiment of the invention, a clamp can be soldered or welded on the central contacting surface of the semiconductor disk which serves as a contact spring and which is put into a blind hole recess of the threaded bolt. Another embodiment according to the invention has a helical compression spring attached or soldered or welded on the central contacting surface of the semiconductor disk, which acts as a pressure contact and is supported in a blind hole or recess of the threaded bolt. The end of the threaded bolt carrying the semiconductor disk can be designed as a hollow rivet to hold the insulating and stiffening disks.

As a third embodiment for the detachable plug connection, the invention provides for a claw having a bent lug which is soldered or welded to the central contacting surface. A flange arranged on the threaded bolt is inserted into the claw. The semiconductor disk can furthermore have on its raised end face a contacting ring on which a contact ring connected with the protective pan is soldered or welded on.

A particular problem arises with many of the embodiments previously described above with regard to thermal stress. It becomes of utmost importance to arrange the contact lugs for supplying current to the silicon disk in a way which minimizes thermal stress. Not only is the location of the contact lug important but the way the lug is attached is also critical.

For example, providing electrical connection between a semiconductor and metal, using heat and pressure in a fusion process can be very expensive and not particularly suited for mass production.

It has been found that the supply of current by the use of a concentric ring as one electrical contact and a central conductor as the other electrical contact will result in higher thermal stress than is desired. An alternative approach which substantially improves the thermal stress of the device is shown in FIGS. 22 through 31.

Figure 22:
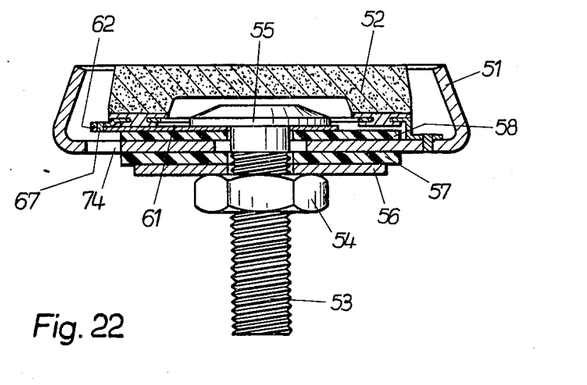
FIG. 22 is a sectional view through the center of the assembled cigar lighter having a silicon carbide disk as heating element in accordance with an embodiment having no central conductor.
Figure 23:
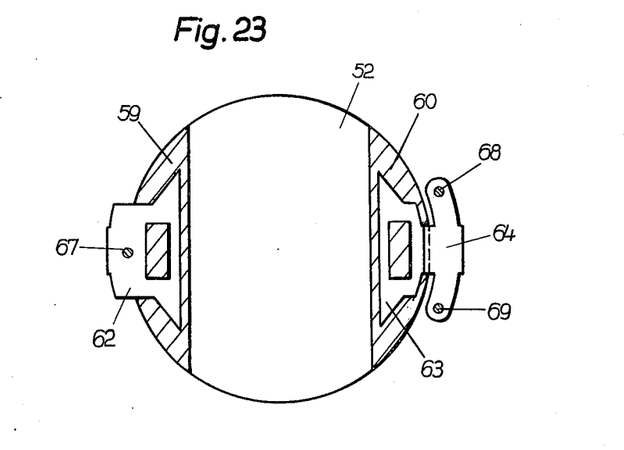
FIG. 23 is a bottom view of FIG. 22 of the silicon carbide disk showing attached contact lugs.

Referring initially to FIGS. 22 and 23, shown there is the silicon carbide disk 52 which is arranged within a pan 51 for the reception of the silicon carbide disk heating element 52. Element 53 represents the supporting bolt which is fastened by nut 54, clamping the bolt to the pan 51. 55 is the bolt head of the supporting bolt. Elements 57 and 58 represent insulating disks. Element 56 is a supporting disk.

Figure 24:
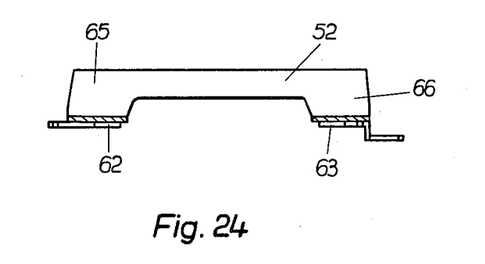
FIG. 24 is a side view of the silicon carbide disk of FIG. 23.

On the semiconductor disk 52, are arranged diametrically supporting portions 65 and 66, as seen in FIG. 24. On these supporting portions, a metallic layer is deposited to serve as contact base material, elements 59 and 60. These contact bases may be more clearly seen in FIG. 25.

Figure 25:
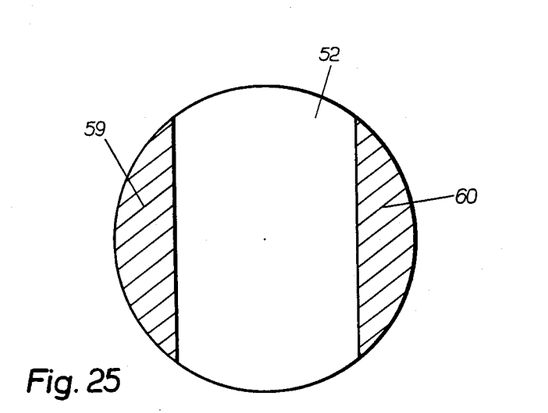
FIG. 25 is a plan view of the contact base of the silicon carbide disk shown in FIGS. 22 – 24.

The two contact lugs are shown as 62 and 63. 62 is directly connected to contact base 59, and 63 is directly connected to contact base 60. Contact lug 63 includes kidney-shaped projection 64.

In the preferred embodiment, the contact bases 59 and 60 are applied by deposition by flame or electric arc spraying. Preferably nickel is employed as a contact base. The contact lugs 62 and 63 are respectively fastened to the contact bases 59 and 60 by a further flame or arc spray process using nickel or similar material. The contact lugs themselves are preferably composed of nickel, nickel alloy or some other scale-free material.

By the above approach, the galvanic connection between the connection lugs and the semiconductor disk is produced. This arrangement also provides the mechanical fastening for the lugs 62 and 63 and is seen to be expediently and simply realized.

Connection lugs 62 and 63 are formed to enable spot-welding. One of the lugs 63 is spot-welded to the pan. The second lug, 62, by way of an attached connection tongue 61, which is insulated from the center of the pan, is spot-welded to form a connection with the clamping bolt 53. Thus, in terms of electrical connections, one terminal is connected to the clamping bolt 53 for connection to lug 62 in base 59 and the second connection is made through the pan by way of element 64 and 63 for connection with base 60.

Kidney-shaped element 64, which is attached to the connection lug 63, provides relief of mechanical stress of the spotwelding. It should also be noted that the trapezoidal connection tongue enables the glow body to be maintained in a predetermined position.

Figures 26, 28:
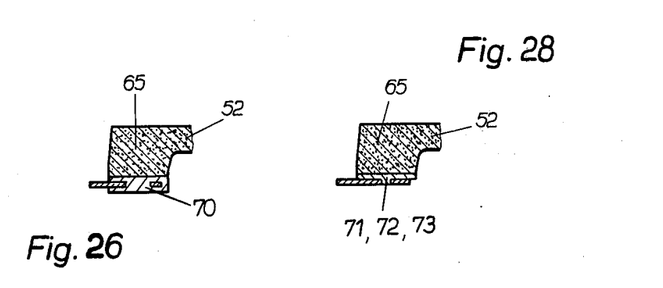
FIG. 26 is a partial sectional view showing the contact material surrounding the contact lug.
FIG. 28 is a sectional view of the attachment of the contact lug on the contact base of the silicon carbide disk welding.
Figure 27:
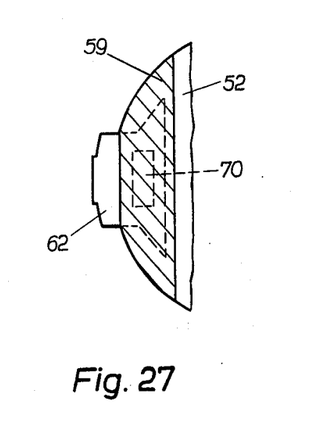
FIG. 27 is a plan view of the contact lug of FIG. 26.

Reference to FIG. 23 is now made, which figure shows the spot-welding points 67, 68 and 69. 67 is the spot-welded point for connection with tongue 61 while 68 and 69 are the spot-weld points for welding with pan 51. Two approaches for attaching the connection lug to the base are shown in FIGS. 26 and 28, together with corresponding FIGS. 27 and 29. FIGS. 26 and 27 illustrate an envelope surrounding method, wherein contact material 70 completely surrounds the portion of the connection lug which is affixed to the silicon carbide disk.

Figure 29:
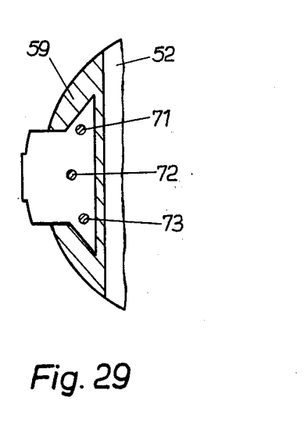
FIG. 29 is a plan view of the contact lug according to FIG. 28.

In FIGS. 28 and 29, the connection lug is attached by way of spot-welding wherein the spot-weld points 71, 72 and 73 are indicated.

Figure 30:
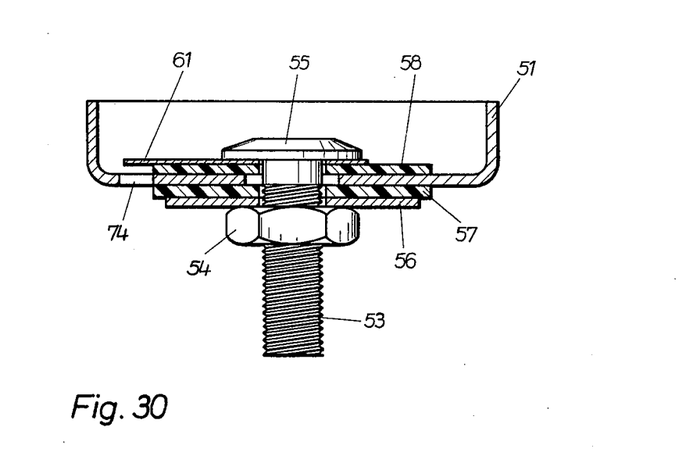
FIG. 30 is a cross-sectional view showing the pan arrangement for receiving the silicon carbide disk in this embodiment.
Figure 31:
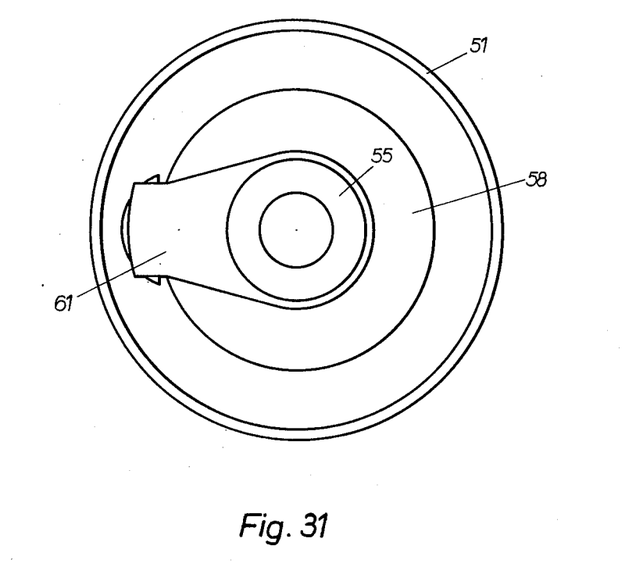
FIG. 31 shows the plan view of the pan of FIG. 30.

The assembly of the unit may be appreciated by referring to FIGS. 30 and 31. The pan 51 is prepared with insulating disks 57 and 58, supporting disk 56 and clamping bolt 53. The relation of the clamping bolt 53 and the connecting tongue 61 is also shown in these figures. Following the assembly of the above elements, the semiconductor disk 52, with attached connections, is inserted. The connection lugs 62 and 63 are then permaenently fastened by spot-welding between the lugs, pan and tongue 61. Afterwards, the pan is appropriately tapered along the border.

In order to add to the mechanical strength of the unit, and for the relief of the flame spray connection against blows, the semiconductor disk 52 can be secured by additional heat-proof insulating masses at one or several points.

As can be seen from this construction, a significant feature is the provision of the two diametrically opposite supporting portions 65 and 66 to the disk 52. These portions provide the mounting place for the contact lugs 62 and 63. The mounting arrangement is made on the supports because here, lower temperatures are present than in the glow zone. The direct connection of the connection lugs with the pan and the central connection also provide for additional and rapid heat conduction. It should be noted that in order to provide appropriate contact resistance at the glow body, it is particularly important that the temperature of the body be held low to prevent nickel oxidation.

While the foregoing specification and drawings represent the preferred embodiments of the present invention, it will be obvious to those skilled in the art that various changes and modifications may be made therein without departing from the true spirit and scope of the present invention.

What is claim is:

1. A glow element arrangement for electric cigarette lighters comprising:
    a disk-shaped semiconductor element of predetermined geometric configuration;
    first and second electrical contacts being electrically and mechanically secured to the element;
    a metallic pan surrounding said disk, said pan being electrically connected to said first contact; and
    a metal supporting bolt for supporting said disk and said pan, said bolt passing through a bore in the bottom of the pan and being electrically insulated therefrom, said bolt being electrically connected to said second electrical contact.

2. The arrangement of claim 1, wherein said first contact is an annular metallic ring surrounding said element and said second contact is centrally disposed on a lower side of said element.

3. The arrangement of claim 1 wherein the element includes two diametrically opposing supporting portions of semiconductor material, said first and second electrical contacts being affixed to said supporting portions.

4. The arrangement of claim 3 wherein the supporting portions have a thin metallic coating deposited thereon and said contacts are affixed to said coating by spot-welding.

5. The arrangement of claim 3 wherein the supporting portions have a thin metallic coating deposited thereon and wherein said contacts have an opening therein and are affixed to said supporting portion by applying an envelope of metallic material.

6. The arrangement of claim 3 wherein one of the contacts includes an L-shaped extension which is spot-welded to the pan.

7. The arrangement of claim 3 including a metallic tongue for electrically connecting the bolt to the element, said tongue being connected by spot-welding to said contact.

8. The arrangement of claim 3 wherein said first and second contacts include a trapezoidal portion.

9. The arrangement of claim 7 wherein said bolt has a head, the connecting tongue being disposed beneath the head, a first insulating element between one side of the pan and the tongue, a second insulating element on the other side of the pan, a retaining washer and a supporting element between the washer and supporting element.

10. The arrangement of claim 7 wherein the pan includes an opening therein to allow spot-welding of the connecting tongue to said contact.

11. The arrangement of claim 3 wherein the contacts are affixed directly to the supporting portions, said contacts having an opening therein, said contact being fastened to said semiconductor disk by a metallic layer covering said contact.

* * * * *